United States Patent
Alvarez Ruiz et al.

(10) Patent No.: US 9,205,728 B1
(45) Date of Patent: Dec. 8, 2015

(54) REINFORCED LIFTGATE FOR A VEHICLE

(71) Applicant: FORD GLOBAL TECHNOLOGIES, LLC, Dearborn, MI (US)

(72) Inventors: Ezequiel Alvarez Ruiz, Mexico City (MX); Tad J. Siedlecki, Dearborn, MI (US); Rabin Bhojan, Northville, MI (US); Michael Shawn Watterworth, Riverview, MI (US); Christina Dung Nguyen, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/331,535

(22) Filed: Jul. 15, 2014

(51) Int. Cl.
    *B60J 5/10* (2006.01)
    *E05F 1/10* (2006.01)

(52) U.S. Cl.
    CPC ............... *B60J 5/107* (2013.01); *E05F 1/1091* (2013.01); *B60J 5/106* (2013.01)

(58) Field of Classification Search
    CPC .............. B60J 5/10; B60J 5/101; B60J 5/106; B60J 5/107; E05F 1/10; E05F 1/1091
    USPC ......... 296/30, 56, 146.5, 146.6, 146.8, 146.9, 296/146.11
    See application file for complete search history.

(56) References Cited

U.S. PATENT DOCUMENTS

| | | | |
|---|---|---|---|
| 4,433,866 A * | 2/1984 | Hagiwara | 296/76 |
| 5,147,106 A * | 9/1992 | Bartelt et al. | 296/202 |
| 6,241,307 B1 | 6/2001 | Kim | |
| 7,306,279 B2 | 12/2007 | Saitoh | |
| 7,827,735 B1 | 11/2010 | Brown et al. | |
| 8,690,220 B2 | 4/2014 | Tsukiyama et al. | |
| 2010/0102590 A1 * | 4/2010 | Miyake et al. | 296/146.8 |

FOREIGN PATENT DOCUMENTS

| | | |
|---|---|---|
| DE | 102011000063 A1 | 7/2012 |
| JP | 3013921 B2 | 2/2000 |
| JP | 2006137208 A | 6/2006 |
| JP | 2012116388 A | 6/2012 |
| KR | 20030016645 A | 3/2003 |
| KR | 100820491 B1 | 4/2008 |

OTHER PUBLICATIONS

Machine English translation for DE102011000063.
Machine English translation for JP3013921.
Machine English translation for JP2006137208.
Machine English translation for JP2012116388.
Machine English translation for KR100820491.
Machine English translation for KR20030016645.

* cited by examiner

Primary Examiner — Jason S Daniels

(74) *Attorney, Agent, or Firm* — Jason Rogers; King & Schickli, PLLC

(57) ABSTRACT

A reinforced liftgate is provided for a vehicle. That reinforced liftgate includes an inner panel having a first aperture and a first reinforcing plate having a second aperture. The first reinforcing plate engages the inner panel so that the first and second apertures are aligned. A first ball stud is mounted to the inner panel in the first and second apertures. In one embodiment the liftgate also includes a hinge reinforcement.

13 Claims, 7 Drawing Sheets

REINFORCED LIFTGATE FOR A VEHICLE

TECHNICAL FIELD

This document relates generally to the automotive vehicle field and, more particularly, to a reinforced liftgate for a vehicle.

BACKGROUND

Vehicles, such as SUVs, incorporating a liftgate are well known in the art. One example of a liftgate assembly may be found in U.S. Pat. No. 7,827,735 to Brown et al. which is assigned to Ford Global Technologies. This document discloses a liftgate assembly incorporating an inner panel and an outer panel joined at their external peripheries by a hem joint. Typically such a liftgate is supported on telescoping gas or hydraulic struts which help to stabilize and hold the liftgate in the open position but also freely retract to allow the liftgate to be closed as desired.

Liftgates of this type must meet a number of requirements relating to torsion, rigidity, cantilevered bending, hinge stability, margin and flushness. While strength is a major consideration, the weight of the liftgate is also a major concern that substantially constrains liftgate design.

This document relates to a new and improved reinforcing plate for a liftgate and to a liftgate reinforced with that plate. Advantageously, the present liftgate includes optimized reinforcements that focus on areas of high stress concentration, where higher loads are applied. These include the ball stud anchoring points of the liftgate struts and the hinge attachment points.

SUMMARY

In accordance with the purposes and benefits set forth herein, a liftgate is provided for a vehicle. The liftgate comprises an inner panel with a first aperture and a first reinforcing plate with a second aperture. The first reinforcing plate engages the inner panel so that the second aperture is aligned with the first aperture. The first ball stud is then mounted to the inner panel in the first and second apertures.

The inner panel includes a hem flange and the first reinforcing plate includes a first depending tab that extends to the hem flange. Further the liftgate includes an outer panel. The inner and outer panels are connected together at a hem that is also reinforced by the first depending tab.

In accordance with an additional aspect, the first reinforcing plate includes a first strengthening rib between the second aperture and the first depending tab.

In one possible embodiment the inner panel further includes a third aperture and a second reinforcing plate is provided with a fourth aperture. The second reinforcing plate engages the inner panel so that the fourth aperture is aligned with the third aperture. Further a second ball stud is mounted to the panel in the third and fourth apertures.

In this second embodiment, the second reinforcing plate includes a second depending tab that extends to the hem flange. Further the second reinforcing plate includes a second strengthening rib between the fourth aperture and second depending tab.

A first strut is secured to the first ball stud and a second strut is secured to the second ball stud.

In yet another embodiment, the liftgate includes a first hinge hanger and a first hinge reinforcement. The first hinge hanger includes a first set of mounting apertures and the first hinge reinforcement includes a second set of mounting apertures. The first hinge hanger is mounted to a first side of the inner panel and the first hinge reinforcement is mounted to a second side of the inner panel with the first and second set of mounting apertures aligned with a third set of mounting apertures in the panel.

Still further, the liftgate includes a second hinge hanger and a second hinge reinforcement. The second hinge hanger includes a fourth set of mounting apertures and the second hinge reinforcement includes a fifth set of mounting apertures. The second hinge hanger is mounted to the first side of the inner panel and the second hinge reinforcement is mounted to the second side of the inner panel with the fourth and fifth set of mounting apertures aligned with a sixth set of mounting apertures in the inner panel. Further the first and second hinge reinforcements each include a pair of strengthening ribs between a pair of strengthening flanges.

In accordance with an additional aspect, a reinforcing plate is provided for reinforcing the vehicle liftgate panel adjacent a ball stud mounting point. The reinforcing plate comprises a body including (a) an aperture for receiving a mounting stem of the ball stud and (b) a depending tab that extends to a hem flange of the panel. Further a strengthening rib is provided in the body between the aperture and the depending tab. In one embodiment the depending tab overlies and strengthens the hem flange at a hem joint provided between the inner panel and an outer panel of the liftgate.

In the following description, there is shown and described several preferred embodiments of the reinforced liftgate. As it should be realized, the reinforced liftgate is capable of other, different embodiments and its several details are capable of modification in various, obvious aspects all without departing from the reinforced liftgate as set forth and described in the following claims. Accordingly, the drawings and descriptions should be regarded as illustrative in nature and not as restrictive.

BRIEF DESCRIPTION OF THE DRAWINGS

The accompanying drawings incorporated herein and forming a part of the specification, illustrate several aspects of the reinforced liftgate and together with the description serve to explain certain principles thereof. In the drawings.

Reference will now be made in detail to the present preferred embodiments of the reinforced liftgate, examples of which are illustrated in the accompanying drawings.

DETAILED DESCRIPTION

Figure 1:
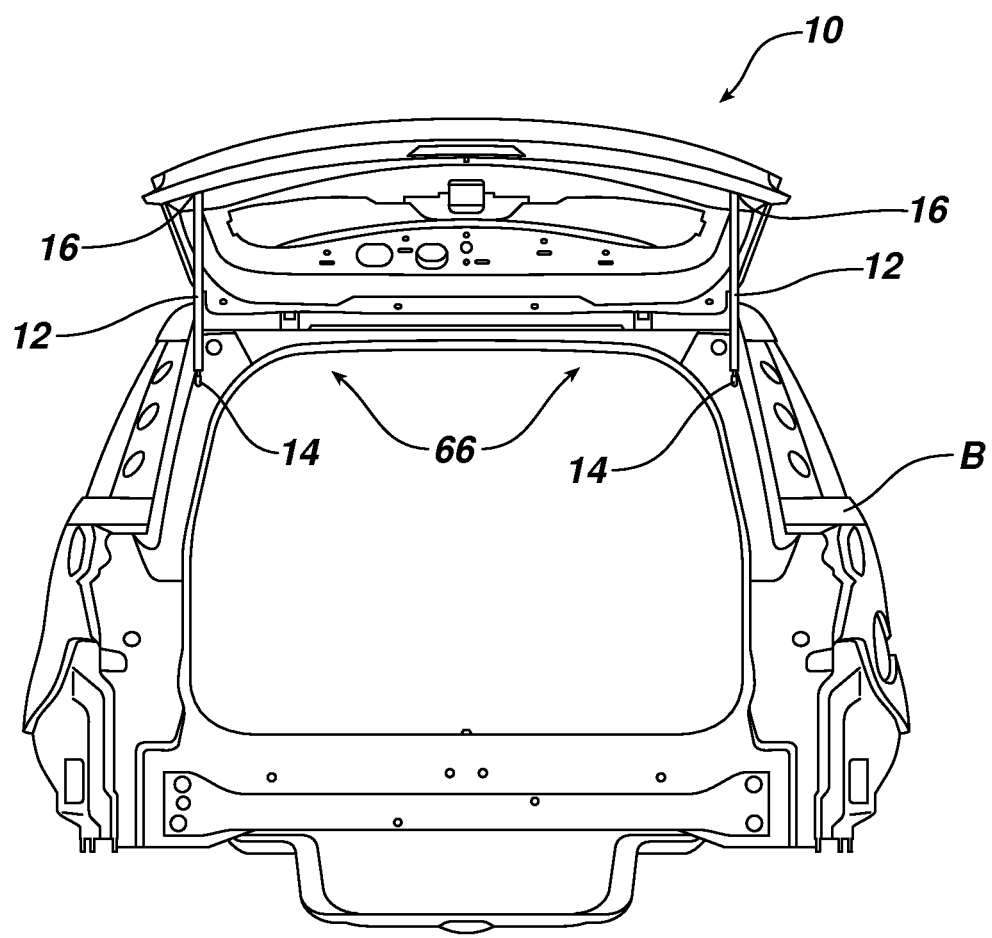
FIG. 1 is a rear elevational view showing an open liftgate on a vehicle body including a pair of struts that hold the liftgate in a stable and open position.

Reference is now made to FIG. 1 showing a liftgate 10 on the vehicle body B. The liftgate 10 is stabilized and held in the open position by means of two struts 12. As should be appreciated, the struts 12 extend on each side of the liftgate 10 between a mounting point 14 on the vehicle body B and a mounting point 16 on the liftgate 10 which comprises a ball stud 16 (see also FIG. 4).

Figure 2:
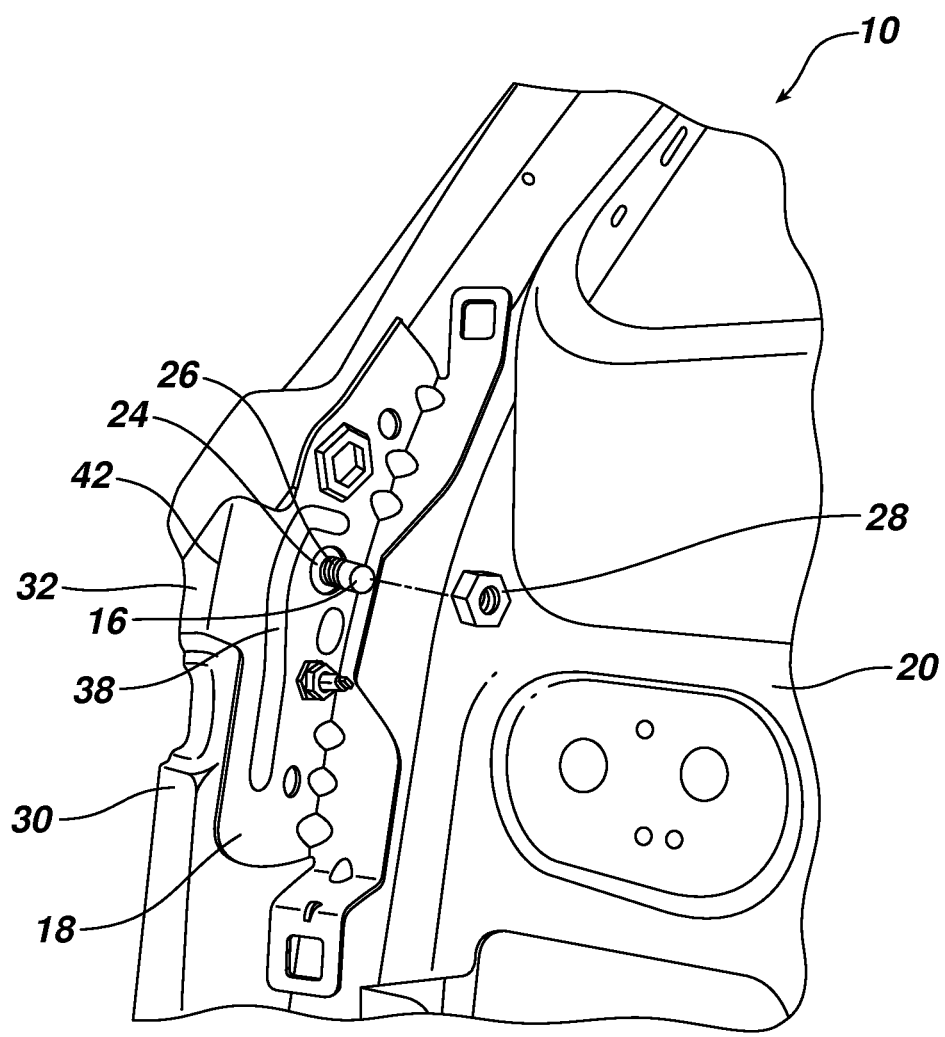
FIG. 2 is a detailed perspective view of a reinforcement plate secured to the inner panel of the liftgate.
Figure 3:
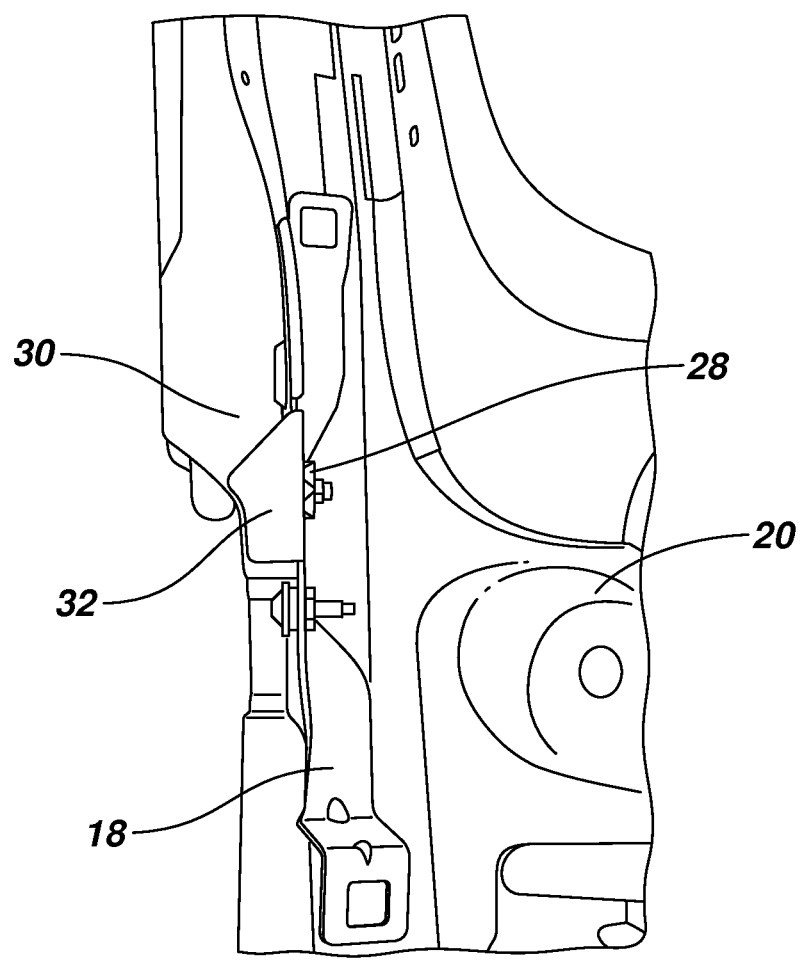
FIG. 3 is a rear elevational view of the depending tab on the reinforcing plate that extends to the hem flange of the inner panel.

Reference is now made to FIGS. 2 and 3 which illustrate a first reinforcing plate 18 that is mounted by spot welding or other means to an inner structural panel 20 of the liftgate 10. As illustrated, the inner panel includes a first aperture and the reinforcing plate 18 includes a second aperture 24. The reinforcing plate 18 is mounted to the inner panel 20 with the first and second apertures 24 aligned. The ball stud 16 includes a threaded stem 26 that extends through the apertures 24 and is engaged by a bolt 28 to secure it in position.

Figure 4:
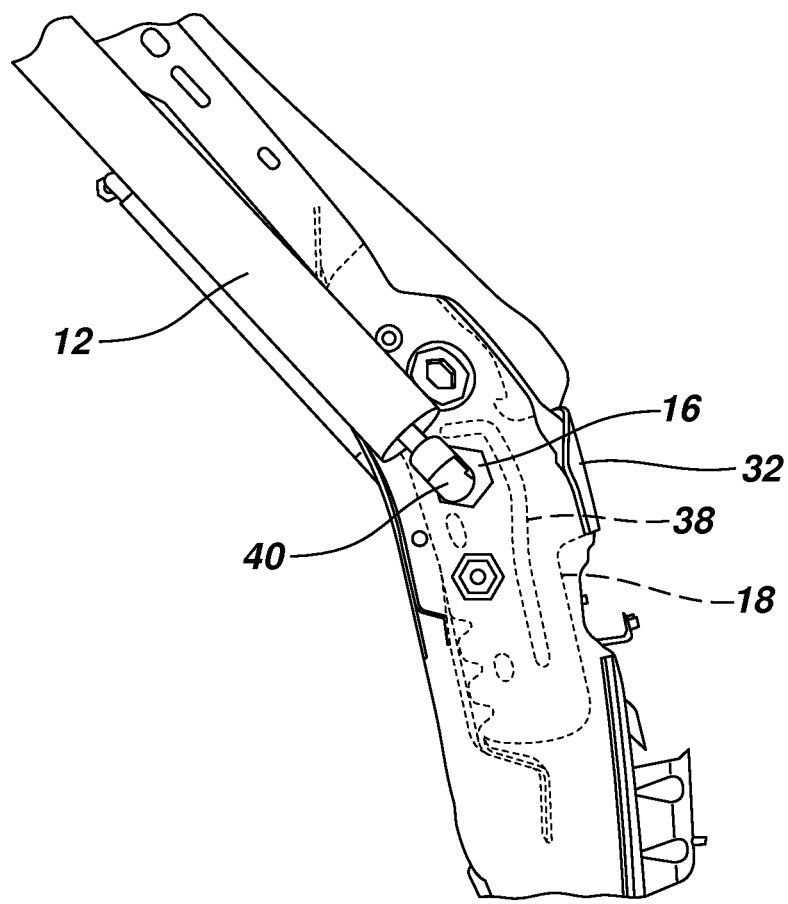
FIG. 4 is a detailed view illustrating the ball stud that is mounted to the inner panel at the reinforcing plate and that supports a strut on one side of the liftgate.
Figure 5:
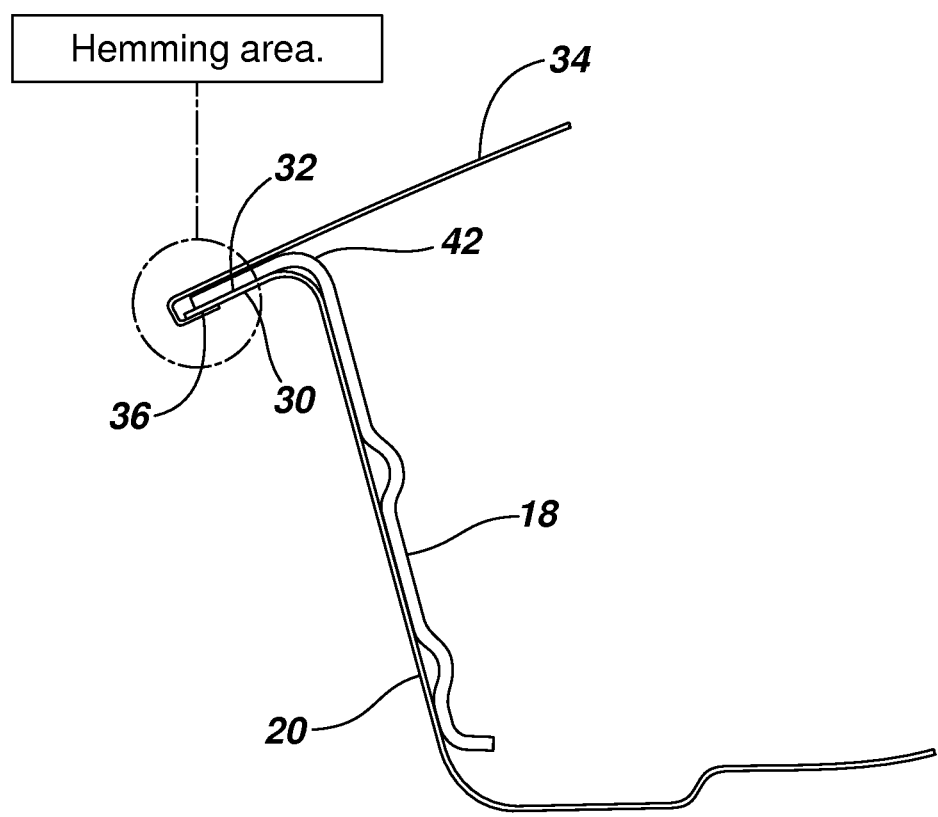
FIG. 5 is a schematical illustration of the hem joint between the inner and outer liftgate panels as reinforced by the depending tab on the reinforcing plate.

As best illustrated in FIGS. 2-5, the inner panel 20 includes a hem flange 30 and the first reinforcing plate 18 includes a first depending tab 32 that extends to the hem flange. As illustrated in FIG. 5, the liftgate 10 also includes an outer structural panel 34 that is not illustrated in the other drawing figures. The inner panel 20 and the outer panel 34 are connected together at a hem joint 36 that is also reinforced by the first depending tab 32. This aspect significantly adds to the structural reinforcement and rigidity of the liftgate.

As best illustrated in FIGS. 2 and 3, the reinforcing plate 18 also includes a first strengthening rib 38 between the aperture 24 in the plate 18 and the depending tab 32. As best illustrated in FIGS. 3 and 4, the strut 12 is connected at one end 40 to the ball stud 16 in a manner known in the art. As should be appreciated, the reinforcing plate 18 includes a margin completely surrounding the mounting aperture in the panel 20. The strengthening rib 38, the bend 42 forming the depending tab 32 and the reinforcement of the hem joint 36 provided by the depending tab all function together to substantially strengthen and reinforce the liftgate 10 at the area of high stress concentration surrounding the ball stud 16. Here it should be appreciated that a similar reinforcing plate (not shown) is provided to reinforce the ball stud mounting point 16 on the opposite side of the liftgate 10 which supports the other strut 12.

Figure 6:
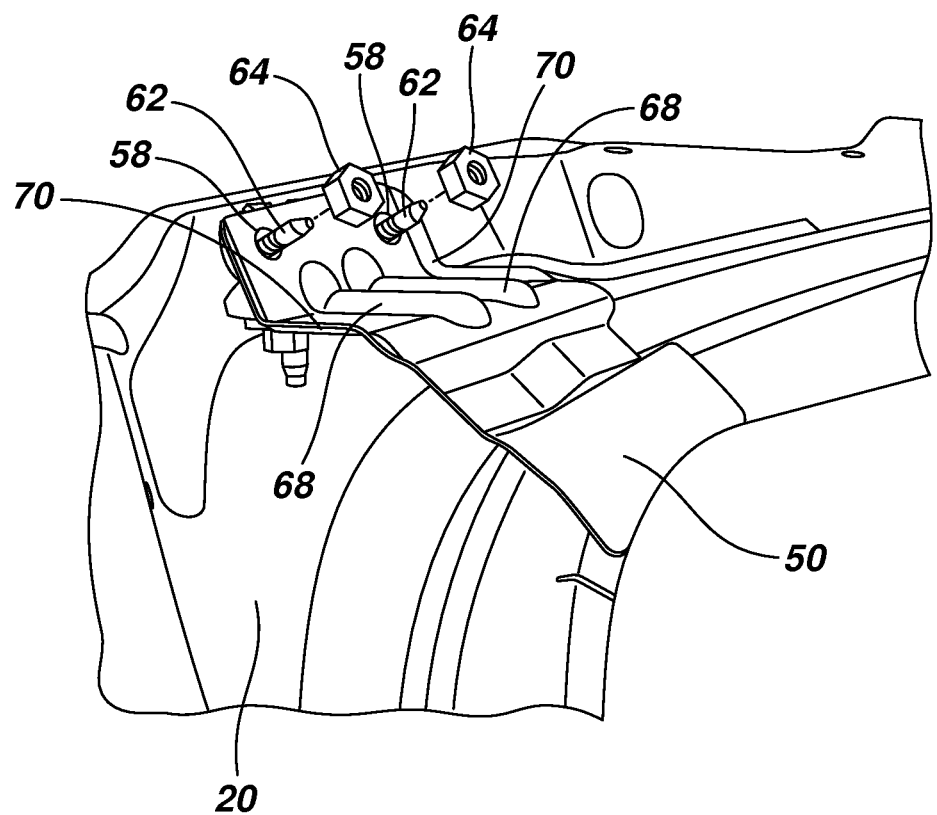
FIG. 6 is a perspective view of the hinge reinforcement of the inner liftgate panel.
Figure 7:
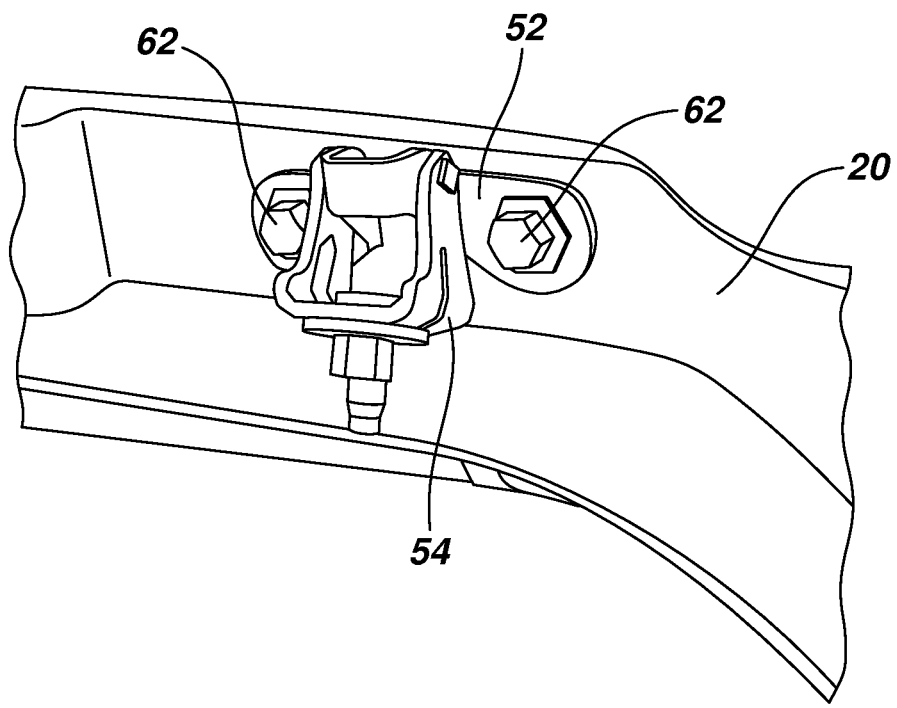
FIG. 7 is a perspective view of the hinge hanger on the liftgate inner panel.

The other reinforcing plate also includes a depending tab 32 that reinforces the hem flange 30 on the other side of the liftgate between the inner and outer panels 20, 34. In one possible embodiment of the invention, the liftgate 10 also includes a hinge reinforcement 50 which reinforces the mounting point of the hinge hanger 52 holding one of the two gate hinges 54 (see FIGS. 6 and 7). As illustrated, the hinge reinforcement 50 is welded or otherwise secured to the inner panel 20 along the inner face thereof opposite the hinge hanger 52. A set of mounting apertures 58 in the hinge reinforcement 50 are aligned with a set of mounting apertures in a hinge hanger 52 and a third set of mounting apertures or anchor points in the inner panel 20. Cooperating anchor bolts 62 and nuts 64 complete the mounting of the hinge hanger 52 to the inner panel 20 of the liftgate 10. While only one hinge assembly, comprising a single hinge reinforcement 50, a single hinge hanger 52 and a single hinge 54 is illustrated in detail in FIGS. 6 and 7, it should be appreciated that two such assemblies 66 are provided on the liftgate (see FIG. 1).

As should be appreciated, each of the hinge reinforcements 50 include a pair of strengthening ribs 68 and a pair of strengthening flanges 70 to provide additional rigidity to the liftgate structure while advantageously minimizing the weight of the reinforcement plate and, therefore, the overall weight of the liftgate 10.

In summary, the new liftgate 10 provides numerous benefits. The reinforcing plates 18 and hinge reinforcements 50 may be manufactured quickly and inexpensively by stamping from high strength steel. The plates 18 and reinforcements 50 may be spot welded to the inner panel 20. The plates 18 include a depending tab 32 that extends to and reinforces the hem joint 36 for added strength and rigidity. Further the gauge of the material used to construct the reinforcing plates 18 is chosen depending upon the stress and loads to which the components are subjected. Thus, for example, a heavier gauge reinforcement may be provided on the power strut side of a liftgate 10. All together, the reinforcing plates 18 and reinforcements 50: (1) are smaller and fewer in number than those they replace and (2) provide improved fit and finish while reducing costs and saving weight.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. A liftgate for a vehicle, comprising:
   an inner panel with a first aperture and a hem flange;
   a first reinforcing plate with a second aperture and a first depending tab that extends to said hem flange, said first reinforcing plate engaging said inner panel so that said second aperture is aligned with said first aperture and said first reinforcing plate including a first strengthening rib between said second aperture and said first depending tab; and
   a first ball stud mounted to said inner panel in said first and second apertures.

2. The liftgate of claim 1, wherein said liftgate further includes an outer panel, said inner panel and said outer panel being connected together at a hem joint that is also reinforced by said first depending tab.

3. The liftgate of claim 1, wherein said inner panel further includes a third aperture.

4. The liftgate of claim 3, further including a second reinforcing plate with a fourth aperture, said second reinforcing plate engaging said inner panel so that said fourth aperture is aligned with said third aperture.

5. The liftgate of claim 4, further including a second ball stud mounted to said inner panel in said third and fourth apertures.

6. The liftgate of claim 5, wherein said second reinforcing plate includes a second depending tab that extends to said hem flange.

7. The liftgate of claim 6, wherein said second reinforcing plate includes a second strengthening rib between said fourth aperture and said second depending tab.

8. The liftgate of claim 7, further including a first strut secured to said first ball stud and a second strut secured to said second ball stud.

9. The liftgate of claim 8, further including a first hinge hanger and a first hinge reinforcement, said first hinge hanger including a first set of mounting apertures and said first hinge reinforcement including a second set of mounting apertures wherein said first hinge hanger is mounted to a first side of said inner panel and said first hinge reinforcement is mounted to a second side of said inner panel with said first and second set of mounting apertures aligned with a third set of mounting apertures in said inner panel.

10. The liftgate of claim 9, further including a second hinge hanger and a second hinge reinforcement, said second hinge hanger including a fourth set of mounting apertures and said second hinge reinforcement including a fifth set of mounting apertures wherein said second hinge hanger is mounted to said first side of said inner panel and said second hinge reinforcement is mounted to said second side of said inner panel with said fourth and fifth set of mounting apertures aligned with a sixth set of mounting apertures in said inner panel.

11. The liftgate of claim 10, wherein said first and second hinge reinforcements each include a pair of strengthening ribs between a pair of strengthening flanges.

12. A reinforcing plate for reinforcing a vehicle liftgate inner panel adjacent a ball stud mounting point, comprising:
    a body including (a) an aperture for receiving a mounting stem of the ball stud, (b) a depending tab that extends to a hem flange of said inner panel and (c) a strengthening rib between said aperture and said depending tab.

13. The plate of claim 12, wherein said depending tab overlies and strengthens said hem flange at a hem joint provided between said inner panel and a liftgate outer panel.

\* \* \* \* \*